United States Patent
Young et al.

(10) Patent No.: US 9,885,848 B2
(45) Date of Patent: Feb. 6, 2018

(54) COMPOSITE CABLE ASSEMBLY WITH NEUTRAL BUOYANCY

(71) Applicant: The Penn State Research Foundation, University Park, PA (US)

(72) Inventors: Randy Young, State College, PA (US); Rita Young, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/268,769

(22) Filed: Sep. 19, 2016

(65) Prior Publication Data

US 2017/0003471 A1     Jan. 5, 2017

Related U.S. Application Data

(63) Continuation-in-part of application No. 14/319,232, filed on Jun. 30, 2014, now Pat. No. 9,606,314.

(60) Provisional application No. 61/957,421, filed on Jul. 2, 2013.

(51) Int. Cl.
| | |
|---|---|
| *G02B 6/50* | (2006.01) |
| *F16L 1/24* | (2006.01) |
| *F16L 1/14* | (2006.01) |
| *G02B 6/44* | (2006.01) |
| *H02G 1/10* | (2006.01) |
| *H02G 9/12* | (2006.01) |

(52) U.S. Cl.
CPC .............. *G02B 6/506* (2013.01); *F16L 1/14* (2013.01); *F16L 1/24* (2013.01); *G02B 6/4427* (2013.01); *H02G 1/10* (2013.01); *H02G 9/12* (2013.01); *Y10T 428/2933* (2015.01)

(58) Field of Classification Search
CPC .. G02B 6/4415; G02B 6/4427; G02B 6/4432; G02B 6/506; H02G 1/10; H02G 9/12; F16L 1/14; F16L 1/24
See application file for complete search history.

(56) References Cited

U.S. PATENT DOCUMENTS

| | | | |
|---|---|---|---|
| 3,262,275 A | 7/1966 | Perret | |
| 3,568,456 A | 3/1971 | Van Loenen | |
| 3,620,028 A * | 11/1971 | Wilde | F16L 1/24 405/166 |

(Continued)

FOREIGN PATENT DOCUMENTS

| | | |
|---|---|---|
| DE | 8629389 U1 | 2/1987 |
| DE | 4006597 A1 | 9/1991 |

OTHER PUBLICATIONS

International Search Report and Written Opinion dated Oct. 14, 2014 for co-pending application No. PCT/US2014/044846.

*Primary Examiner* — Daniel Petkovsek
(74) *Attorney, Agent, or Firm* — Dinsmore & Shohl LLP

(57) ABSTRACT

An Above Bottom Fiber (ABF) cable includes an elongated fiber cable having microspheres adhered to the ABF by an adhesive lightly coated to the outer surface of the ABF. The elongated fiber cable is negatively buoyant while the microspheres and adhesives are positively buoyant, resulting in the ABF cable being controllably buoyant in a fluid environment. Anchor lines with optional anchor weights are attached to the fiber cable periodically to prevent the fiber cable from drifting. The microspheres detach slowly from the fiber cable resulting in the ABF cable sinking. All components of the ABF cable are biodegradable.

25 Claims, 7 Drawing Sheets

(56) References Cited

U.S. PATENT DOCUMENTS

| | | | |
|---|---|---|---|
| 3,766,307 A | 10/1973 | Andrews, Jr. | |
| 4,048,686 A * | 9/1977 | Ege | B63B 22/18 |
| | | | 114/333 |
| 4,104,886 A | 8/1978 | Dumont et al. | |
| 4,132,084 A * | 1/1979 | Francisco-Arnold | F16L 1/14 |
| | | | 174/101.5 |
| 4,263,004 A * | 4/1981 | Joubert | E21B 17/015 |
| | | | 405/171 |
| 4,341,440 A | 7/1982 | Trezeguet et al. | |
| 4,399,322 A | 8/1983 | Hafner, Jr. | |
| 4,477,725 A | 10/1984 | Asawa et al. | |
| 4,610,505 A | 9/1986 | Becker et al. | |
| 4,659,253 A * | 4/1987 | Jacobson | F16L 1/163 |
| | | | 405/158 |
| 4,662,712 A | 5/1987 | Tabata et al. | |
| 4,763,981 A | 8/1988 | Wilkins | |
| 5,054,881 A | 10/1991 | Fisher et al. | |
| 5,194,847 A | 3/1993 | Taylor et al. | |
| 5,784,337 A | 7/1998 | Rainey et al. | |
| 5,923,616 A | 7/1999 | Badger et al. | |
| 6,060,153 A * | 5/2000 | McNeil | B32B 5/24 |
| | | | 119/207 |
| 6,211,964 B1 | 4/2001 | Luscombe et al. | |
| 6,239,363 B1 | 5/2001 | Wooters | |
| 6,285,806 B1 | 9/2001 | Kersey et al. | |
| 6,323,420 B1 | 11/2001 | Head | |
| 6,980,108 B1 | 12/2005 | Gebbia et al. | |
| 7,271,884 B2 | 9/2007 | Payton | |
| 7,274,441 B2 | 9/2007 | Payton | |
| 7,277,162 B2 | 10/2007 | Williams | |
| 7,488,929 B2 | 2/2009 | Townley-Smith et al. | |
| 7,544,286 B2 * | 6/2009 | Tharp | A01K 63/04 |
| | | | 119/227 |
| 7,621,229 B2 * | 11/2009 | Bowen | B63G 8/001 |
| | | | 114/244 |
| 7,755,971 B2 | 7/2010 | Heatley et al. | |
| 7,822,306 B2 | 10/2010 | Shinoski et al. | |
| 7,993,077 B2 | 8/2011 | Alliot | |
| 8,054,070 B1 | 11/2011 | Lanzagorta-Saldana | |
| 8,195,409 B2 | 6/2012 | Bruno et al. | |
| 8,226,328 B2 | 7/2012 | Thompson et al. | |
| 8,279,714 B2 | 10/2012 | Paul et al. | |
| 8,340,844 B2 | 12/2012 | Scoca et al. | |
| 8,369,673 B2 | 2/2013 | Hawkes et al. | |
| 8,493,815 B2 | 7/2013 | Fernihough et al. | |
| 8,837,938 B2 | 9/2014 | Liu et al. | |
| 8,937,713 B2 | 1/2015 | Huffman | |
| 8,957,312 B2 | 2/2015 | McCullough et al. | |
| 9,606,314 B2 * | 3/2017 | Young | G02B 6/4427 |
| 2004/0020653 A1 | 2/2004 | Smith | |
| 2006/0120675 A1 | 6/2006 | Goldner et al. | |
| 2008/0014812 A1 | 1/2008 | Quigley et al. | |
| 2009/0145613 A1 | 6/2009 | Coronado | |

* cited by examiner

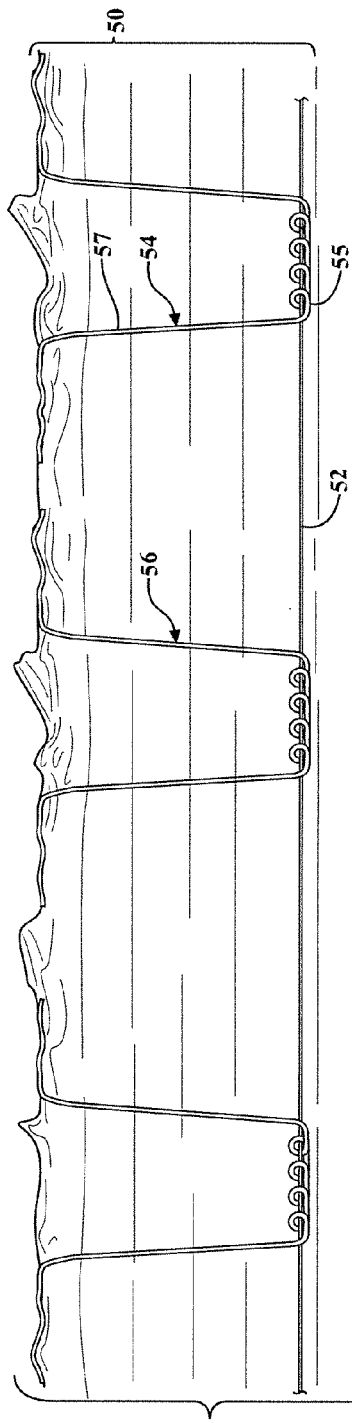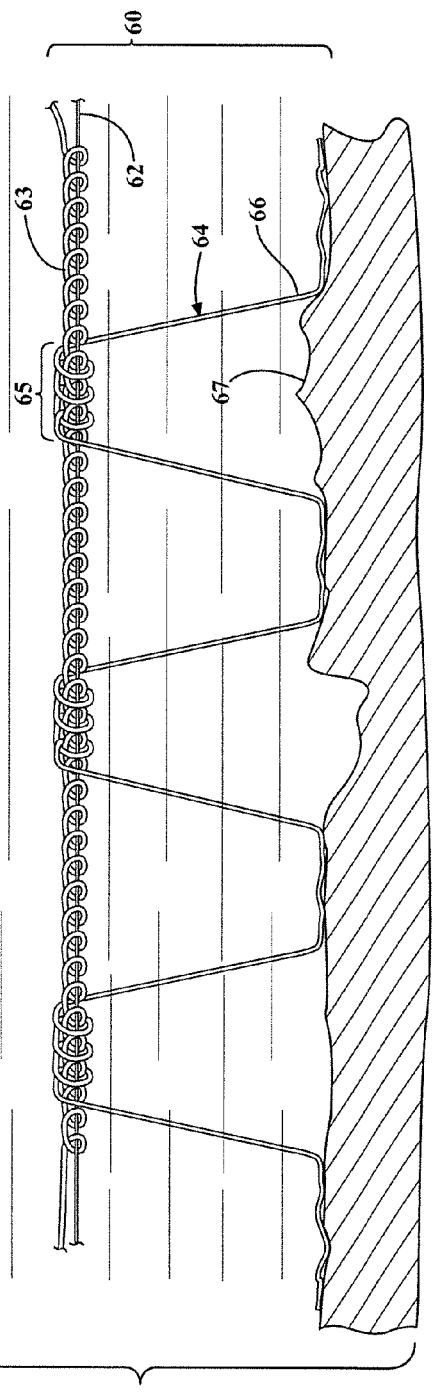

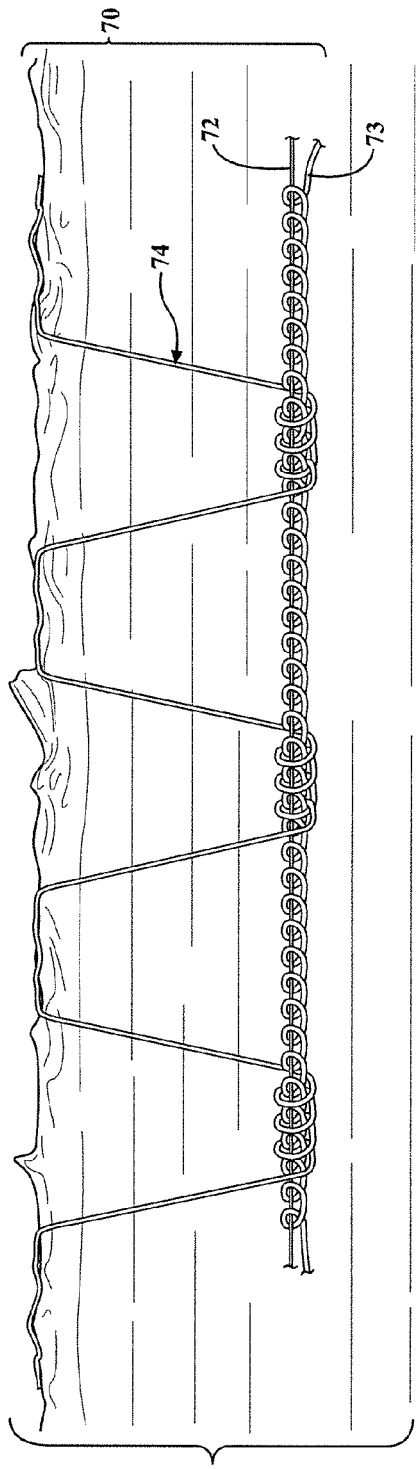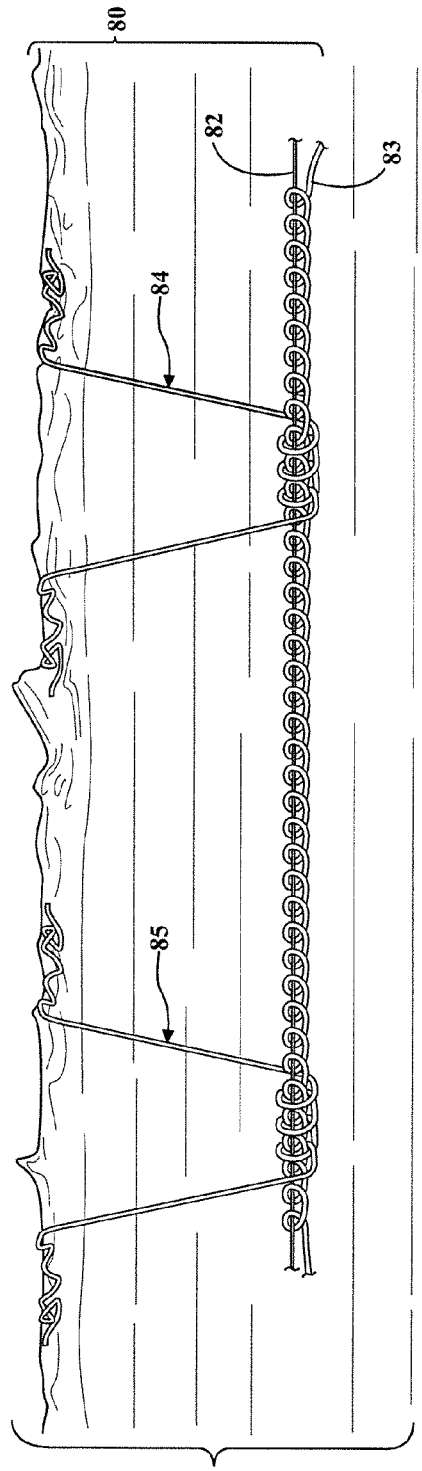
FIG. 7
FIG. 8

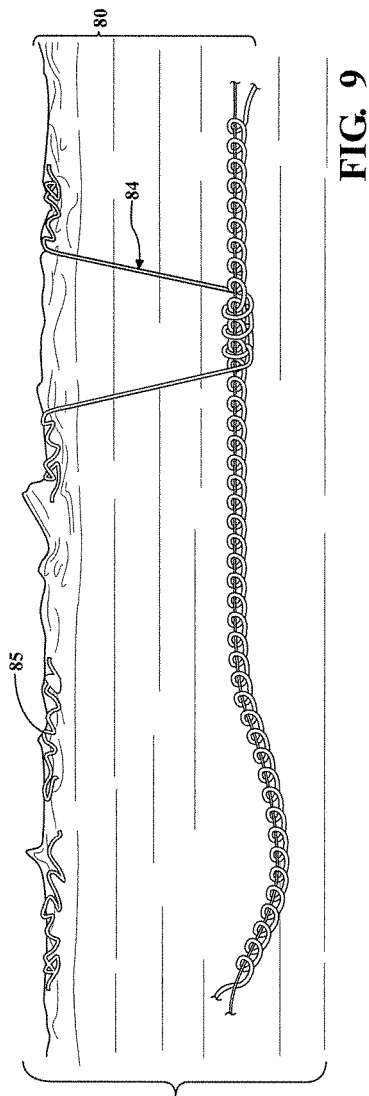
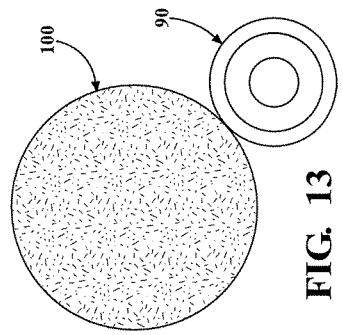
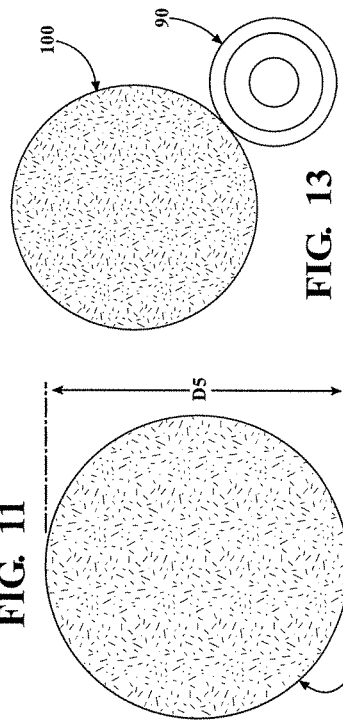
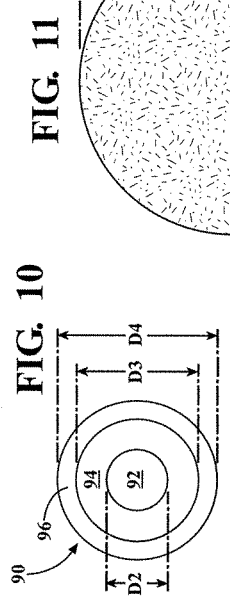
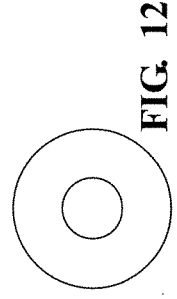

COMPOSITE CABLE ASSEMBLY WITH NEUTRAL BUOYANCY

CROSS-REFERENCE TO RELATED APPLICATIONS

This Application is a Continuation-in-Part of application Ser. No. 14/319,232, filed on Jun. 30, 2014, now U.S. Pat. No. 9,606,314, which claims the benefit of U.S. Provisional Application 61/957,421, filed on Jul. 2, 2013, the contents of each of which are incorporated herein in their entirety.

FIELD OF THE INVENTION

The present invention relates generally to elongated elements such as communication cables suspended in a fluid environment.

BACKGROUND OF THE INVENTION

There are a variety of situations in which it is desirable to submerge an elongated element such as a communication cable in a fluid environment, such as the ocean, and for the element to be generally suspended between an upper and lower boundary of that fluid environment. An example of such an application is where a ship needs to communicate to shore or to another location at high data rates and with low latency. Communication systems utilizing satellite links have drawbacks, such as high latency.

One approach is to connect the ship to a communication site using a communication cable, with the cable being suspended in the fluid environment between the ship and the communication site. Fiber optic cables provide for high data rate and low latency communication. However, a "raw" optic fiber has a density greater than water and therefore will sink to the lower boundary of a fluid environment. This may be undesirable. Jacketed cable assemblies have been provided that are constructed so as to have a neutral buoyancy. However, such composite cables typically have high cost and are bulky.

SUMMARY OF THE INVENTION

The present invention provides various embodiments of composite assemblies adapted to provide a functionally controllable buoyancy in a fluid environment. Composite assemblies include an elongated element such as an optical fiber cable and one or more supplemental filaments connected together so as to provide a composite assembly with a functionally controllable buoyancy. Composite assemblies may alternatively include an elongated element that is naturally negatively buoyant and is then covered with positively buoyant microspheres so as to provide a composite assembly with a functionally controllable buoyancy. The controllable buoyancy may be negative, neutral or positive. Further suspension elements may be attached to anchor the composite assembly to either the fluid surface or bottom.

According to an embodiment of the present invention, an optical fiber cable is provided for use in a fluid environment. An elongated optical fiber cable has a naturally negative buoyancy in a fluid environment, and has an outer surface. A first supplemental filament has a positive buoyancy in the fluid environment. An optional first supplemental filament is connected to the elongated optical fiber cable to form a composite cable assembly having a composite buoyancy. The quantity of the first supplemental filament per unit length of the optical fiber is chosen such that the composite buoyancy in the fluid environment is nearly neutral, but decidedly either positively or negatively buoyant. Suspension elements then act to suspend the positive or negative buoyant composite cable away from either the surface or bottom of the fluid. The suspension elements can act as the supplemental filament or simply as anchors to the fluid boundaries. In certain versions, the first supplemental filament is connected to the elongated optical fiber cable by the first supplemental filament being at least partially coiled around the outer surface of the elongated optical fiber cable. In certain versions, the first supplemental filament has connected portions connected to the optical fiber cable and detached portions not connected to the optical cable fiber such that the detached portions may extend away from the optical fiber cable in the fluid environment. The connected portions may be connected to the elongated fiber cable by the connected portions being at least partially coiled around the outer surface of the elongated optical fiber cable.

In certain versions, the first supplemental filament comprises a plurality of filament segments, each being connected to the optical fiber cable and spaced apart along the length of the elongated optical fiber cable. At least some of the filament segments each have a connected portion connected to the optical fiber cable and a detached portion not connected to the optical fiber cable such that the detached portion may extend away from the optical fiber cable in the fluid environment. The connected portions of the filament segments may be connected to the elongated optical fiber cable by the connected portions being at least partially coiled around the outer surface of the elongated optical fiber cable.

In certain versions the elongated optical fiber cable is selected from a group consisting of raw optical fiber and jacketed cable having at least one optical fiber surrounded by a jacket. In certain versions, the first supplemental filament is selected from a group consisting of thread formed of fibers, solid thread and hollow thread. In some versions, the first supplemental filament has a specific gravity within the range of 0.75 to 0.5 and in some versions the first supplemental filament has a radius that is greater than a diameter of the elongated optical fiber cable. For example, the radius of the first supplemental filament may be greater than the diameter of the optical fiber cable by a factor of 1.5.

In certain versions, the optical fiber cable assembly further includes a second supplemental filament having a negative buoyancy in a fluid environment. The second supplemental filament is connected to the elongated optical fiber cable and forms part of the composite fiber assembly. The quantity of the first and second supplemental filaments per unit length of the optical fiber are chosen such that the composite buoyancy in the fluid environment is generally neutral. The first and second supplemental filaments may be connected to the elongated optical fiber cable by the filaments being at least partially coiled around the outer surface of the elongated optical fiber cable. At least one of the supplemental filaments may have connected portions connected to the optical fiber cable and detached portions not connected to the optical fiber cable such that the detached portions may extend away from the optical fiber cable in the fluid environment. The connected portions may be connected to the elongated optical fiber cable by being at least partially coiled around the outer surface of the cable. At least one of the filaments may comprise a plurality of filament segments each connected to the cable and spaced apart along the length of the cable. At least some of the filament segments may have a connected portion that is connected to the cable and a detached portion not connected to the cable.

The connected portions may be connected by coiling around the cable. The first and second supplemental filaments may be selected from a group consisting of thread formed of fibers, solid thread and hollow thread. The first supplemental filament may have a specific gravity within a range between 0.75 and 0.5. The first or second supplemental filament may have a radius that is greater than the diameter of the elongated optical fiber cable, such as having a radius that is greater than the diameter of the cable by a factor of 1.5.

In certain versions, the first supplemental filament is replaced by covering the fiber optic with a grease-like coating that has controllable buoyancy elements, such as vacuum-filled microspheres, integrated into the grease-like coating. The thickness or density of the grease-like buoyant coating can control the buoyancy of the composite cable to positive, neutral or negative buoyancy; thus, enabling selectable buoyancy control.

The present invention further provides a communication system for providing a physical communication connection between a communication site and a remote vehicle in a fluid environment having an upper boundary and lower boundary. An optical fiber cable assembly is provided in accordance with any embodiment of the present invention. The optical fiber cable assembly has a first end and a second end, with the first end physically connected to the communication site and the second end physically connected to the remote vehicle. A portion of optical fiber cable assembly extends between the communication site and the remote vehicle through the fluid environment and is suspended in the fluid environment between the upper boundary and lower boundary. The communication site may be a second vehicle.

The present invention further provides an elongated composite assembly adapted for use in the fluid environment having an upper boundary and a lower boundary. The composite assembly includes an elongated element having a first buoyancy in a fluid environment, and having an outer surface. A first elongated supplemental filament has a second buoyancy different from the first buoyancy in the fluid environment. The elongated element and the first elongated supplemental filament are connected along their lengths so as to form a composite assembly with a composite buoyancy selected such that the composite assembly is suspended between the upper boundary and the lower boundary of the fluid environment. The elongated element may be a communication or signal carrying element, such as an optical fiber cable. In some versions, the first supplemental filament is connected to the elongated element by being at least partially coiled around the outer surface of the elongated element.

In certain versions, the first supplemental filament has connected portions connected to the elongated element and detached portions not connected to the element such that the detached portions may extend away from the elongated element in the fluid environment. The connected portions may be connected by being at least partially coiled around the outer surface of the elongated element.

In some versions, the first supplemental filament comprises a plurality of filament segments each being connected to the elongated element and spaced apart along the length of the elongated element. At least some of the filament segments may have a connected portion connected to the elongated element and a detached portion not connected to the elongated element such that the detached portions may extend away from the elongated element in the fluid environment. The connected portions may be connected by being at least partially coiled around the outer surface of the elongated element.

In some versions, the first supplemental filament is selected from the group consisting of thread formed of fibers, solid thread and hollow thread. In some versions, the first supplemental filament has a specific gravity in a range between 0.75 and 0.5 and may have a radius that is greater than a diameter of the elongated element, such as being greater than the diameter by a factor of 1.5.

Certain versions further include a second elongated supplemental filament having a third buoyancy different from the first and second buoyancies in the fluid environment. The second supplemental filament is connected to the elongated element along its length and forms part of the composite assembly having the composite buoyancy. The first and second supplemental filaments may be connected to the elongated element by being at least partially coiled around the outer surface of the elongated element. At least one of the filaments may have connected portions connected to the elongated element and detached portions not connected to the elongated element such that the detached portions may extend away from the elongated element in the fluid environment. The connected portions may be connected by being at least partially coiled around the outer surface of the elongated element.

In some versions, at least one of the filaments compromises a plurality of filament segments each connected to the elongated element and spaced apart along a length of the elongated element. At least some of the filament segments may have a connection portion connected to the elongated element and a detached portion not connected to the elongated element such that the detached portion may extend away from the elongated element in the fluid environment. The connection portions may be connected by being at least partially coiled around the outer surface of the elongated element.

The present invention further provides a method of suspending an optical fiber or other elongated element in a fluid environment. An elongated optical fiber cable is provided, with the cable having a negative buoyancy in a fluid environment. A first supplemental filament having a positive buoyancy is also provided. At least a portion of the first supplemental filament is connected to the optical fiber cable to form a composite assembly having a composite buoyancy. The quantity of the first supplemental filament per unit length of the fiber cable is selected such that the composite buoyancy in the fluid environment is generally neutral. In some versions, the first supplemental filament is connected to the optical fiber cable as the optical fiber cable is dispensed into the fluid environment. The connecting step may compromise of connecting the first supplemental filament to the optical fiber cable by at least partially coiling the first supplemental filament around an outer surface of the optical fiber cable as the optical fiber cable is dispensed into the fluid environment. The connecting step may compromise at least partially coiling the first supplemental filament around an outer surface of the optical fiber cable as the optical fiber cable is dispensed into the fluid environment.

In some versions, the first supplemental filament is connected to the elongated optical fiber cable by being at least partially coiled around the outer surface of the cable. In some versions, the connecting step comprises connecting portions of the first supplemental filament to the optical fiber cable and not connecting other portions to the optical fiber cable such that the portions that are not connected may extend away from the cable in the fluid environment. The connecting step may comprise coiling the connected portions around the outer surface of the cable.

In some versions, the first supplemental filament comprises a plurality of filament segments and the connecting step comprises connecting at least a portion of each of the filament segments to the optical fiber cable, spaced apart along the length of the cable. The connecting step may comprise connecting at least a portion of some of the filament segments to the optical fiber cable and not connecting another portion to the optical fiber cable such that the portions that are not connected extend away from the cable in the fluid environment. The connecting step may comprise coiling the connected portions around the outer surface of the cable.

In some versions, the elongated optical fiber cable is selected from a group consisting of raw optical fiber and jacketed cable having at least one optical fiber surrounded by a jacket. In some versions, the first supplemental filament is selected from a group consisting of thread formed of fibers, solid thread and hollow thread. In some versions, the first supplemental filament has a specific gravity in a range between 0.75 and 0.5. In some versions, the first supplemental filament has a radius that is greater than the diameter of the elongated optical fiber.

In some versions, the method further comprises providing a second supplemental filament having a negative buoyancy in a fluid environment. At least a portion of the second supplemental filament is connected to the optical fiber cable to form the composite cable assembly having the composite buoyancy. The quantity of first supplemental filament and second supplemental filament per unit length of the optical fiber cable is selected such that the composite buoyancy in the fluid environment is generally neutral. In some versions, the first and second supplemental filament is connected to the optical fiber cable as the optical fiber cable is dispensed into the fluid environment. The connecting step may comprise connecting the first and second filaments to the cable by at least partially coiling the filaments around an outer surface of the cable as the cable is dispensed into the fluid environment.

In some versions, the method further comprises not connecting at least a portion of the first or second supplemental filaments to the cable such that the detached portions may extend away from the cable in the fluid environment. In some versions, the first or second supplemental filament comprises a plurality of filament segments and the connecting step comprises connecting at least a portion of each of the filament segments to the optical fiber cable with the segments spaced apart along the length of the cable. The connecting step may further comprise not connecting at least a portion of at least some of the filament segments to the optical fiber cable such that the detached portions may extend away from the optical fiber cable in the fluid environment.

The present invention further provides various embodiments of composite assemblies which include an elongated cable covered with low-density materials. An example of the low-density materials is microspheres. Microspheres are small spherical particles, with diameters in the micrometer range. Microspheres may be made from different types of materials, such as glass, polymer and ceramic. Microspheres can be of different sizes, strengths and densities. Microspheres having a positive buoyancy are typically used as additives to lower the density of a material. Hy-Tech ThermaCels™ ceramic microspheres are an example of commercially available microspheres. According to an embodiment of the present invention, an optical fiber cable is provided for use in a fluid environment. An elongated optical fiber cable has a negative buoyancy in a fluid environment, and has an outer surface. The microspheres have a positive buoyancy in the fluid environment. The microspheres can be loosely adhered to the elongated cable by adhesives. Adhesives may be organic and positively buoyant in the fluid environment, such as petroleum jelly. The composite assembly, which includes the elongated cable, the microspheres and the adhesives, may be positively buoyant.

According to an embodiment of the present invention, additional anchor lines and/or anchor weights may be attached to the elongated cable to suspend the composite cable in the fluid environment.

The present invention further provides a method of suspending an elongated cable in a fluid environment. An elongated cable having a negative buoyancy in a fluid environment is provided. The elongated cable has an outer surface. The outer surface of the elongated cable is covered with positively buoyant low-density materials such as floating ceramic microspheres. The microsphere may be adhered to the outer surface of the elongated cable by weak adhesives, such as petroleum jelly, which is buoyant in the fluid environment. The assembly as a whole may have a controllable buoyancy.

In some versions, additional anchor lines and/or anchor weights may be attached to the elongated cable. If the assembly is positive buoyant, the anchors may be attached to the bottom of the fluid environment to keep the assembly cable suspended in the fluid. If the assembly is negatively buoyant, the anchors may be attached to the surface of the fluid environment to keep the assembly cable suspended in the fluid.

In some versions, the composite assembly may be slightly negatively buoyant and provide for a very slowly sinking composite cable.

Due to wave motion and biologics interaction with the cable, the microspheres will detach and float to the surface. When some percentage of the microsphere release, the entire system will become negatively buoyant and all elements will sink to the bottom at a sink rate. The sink rate may be controlled by controlling the size of the microspheres, type of the adhesive, and type of the elongated cable.

According to certain embodiments, the elongated cable, adhesives, microspheres, anchor lines and weights are all biodegradable are therefore disposable after use.

BRIEF DESCRIPTION OF THE DRAWINGS

FIG. 5 is a view of a further composite cable assembly in accordance with an embodiment of present invention;

FIG. 6 is a view of another composite cable assembly in accordance with an embodiment of present invention;

FIG. 7 is a view of a further composite cable assembly in accordance with the present invention;

FIG. 8 is a view of yet another composite cable assembly in accordance with an embodiment of the present invention;

FIG. 9 is a view of a composite cable assembly in which a supplemental filament has become detached;

FIG. 10 is a cross-sectional view of an exemplary raw optical fiber;

FIG. 11 is a cross-sectional view of an exemplary supplemental filament for use with the present invention;

FIG. 12 is a cross-sectional view of an alternative supplemental filament for use with the present invention;

FIG. 13 is a cross-sectional view of an optical fiber with a supplemental filament dispensed adjacent the outer surface of the optical fiber;

DETAILED DESCRIPTION OF THE PREFERRED EMBODIMENTS

The present invention provides a composite assembly adapted for use in a fluid environment, where an elongated element, such as an optical fiber, having a first buoyancy in a fluid environment and a supplemental filament having second buoyancy different from the first buoyance are connected to one another along their lengths so as to form a composite assembly with a composite buoyancy that is functionally neutral in the fluid environment, allowing the composite assembly to be suspended between an upper and lower boundary of the fluid environment. Such a composite assembly may include an elongated element that is a communication or signal carrying element, such as a raw optical fiber or a jacketed cable having at least one optical fiber surrounded by a jacket. This elongated element, on its own, may have a negative buoyancy in the fluid environment. A supplemental filament, such as a thread, may, on its own, have a positive buoyancy on the fluid environment. The elongated element and the supplemental filament are connected to one another along their lengths, such as by at least partially coiling the supplemental filament around the outer surface of the elongated element. By selecting a quantity of the supplemental filament per unit length of the elongated element, a composite assembly may be formed that is generally neutrally buoyant in the fluid environment.

As will be clear to those of skill in the art, the buoyancy of an element depends on the fluid environment. For example, salt water in the ocean is significantly denser than fresh water. The buoyancy of an element will depend both on its density as compared to the fluid environment and the amount of air that may be entrapped by an element. An element or assembly may be referred to herein as generally neutrally buoyant or functionally neutrally buoyant when that element or assembly may be suspended in the fluid environment between an upper and lower boundary of the fluid environment and the element or assembly will remain between the upper and lower boundaries for more than a trivial period of time. An assembly may be considered to be suspended between the upper and lower boundaries even where a disconnected portion of a supplemental filament extends to the upper or lower boundary. As known to those of skill in the art, the density of water, such as sea water, varies depending on location, depth, and other factors, and may change over time at a given location.

Figure 1:
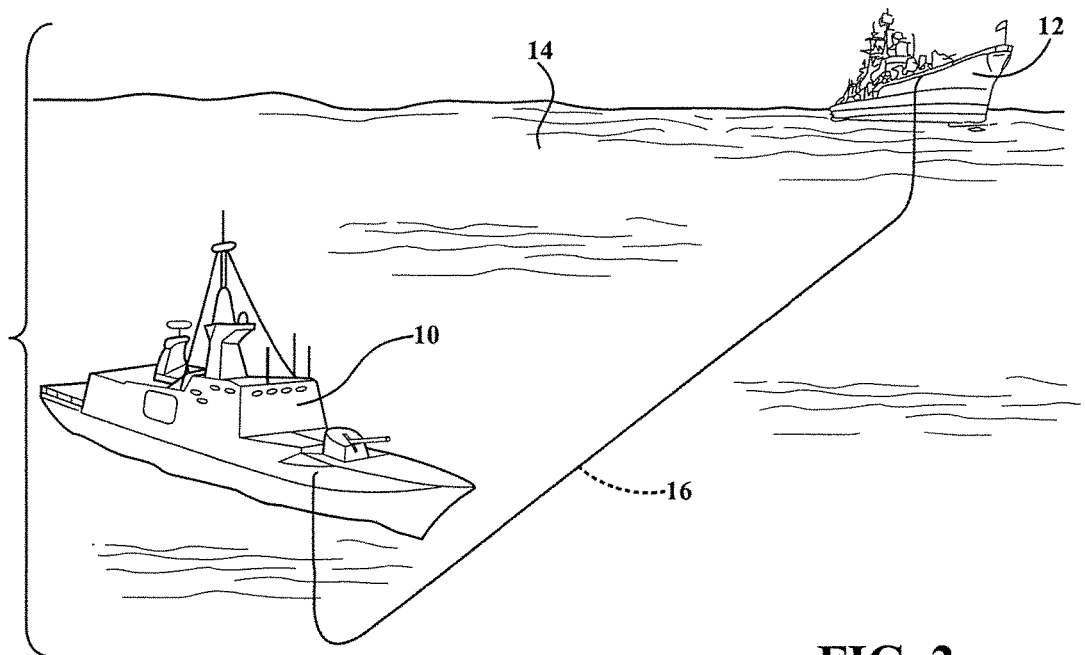
FIG. 1 is a perspective view of a pair of ships with a cable assembly in accordance with the present invention connecting the ships for communication purposes.

Referring now to FIG. 1, a first ship 10 and second ship 12 are shown on a body of water 14, representing a fluid environment. A composite communication assembly 16 is shown extending between the ships 10 and 12 and dispensed below the surface of the fluid environment 14. This represents an exemplary application for an elongated composite assembly of the present invention as well as an embodiment of the present invention. Additional applications include communication between a ship and shore or communication between any two points separated by a fluid environment. A portion of the composite assembly may be stored on one of the ships and paid out or collected as necessary to establish and maintain communication. For example, the position of the ships or other points may change relative to each other, especially when a ship is under way.

Figure 2:
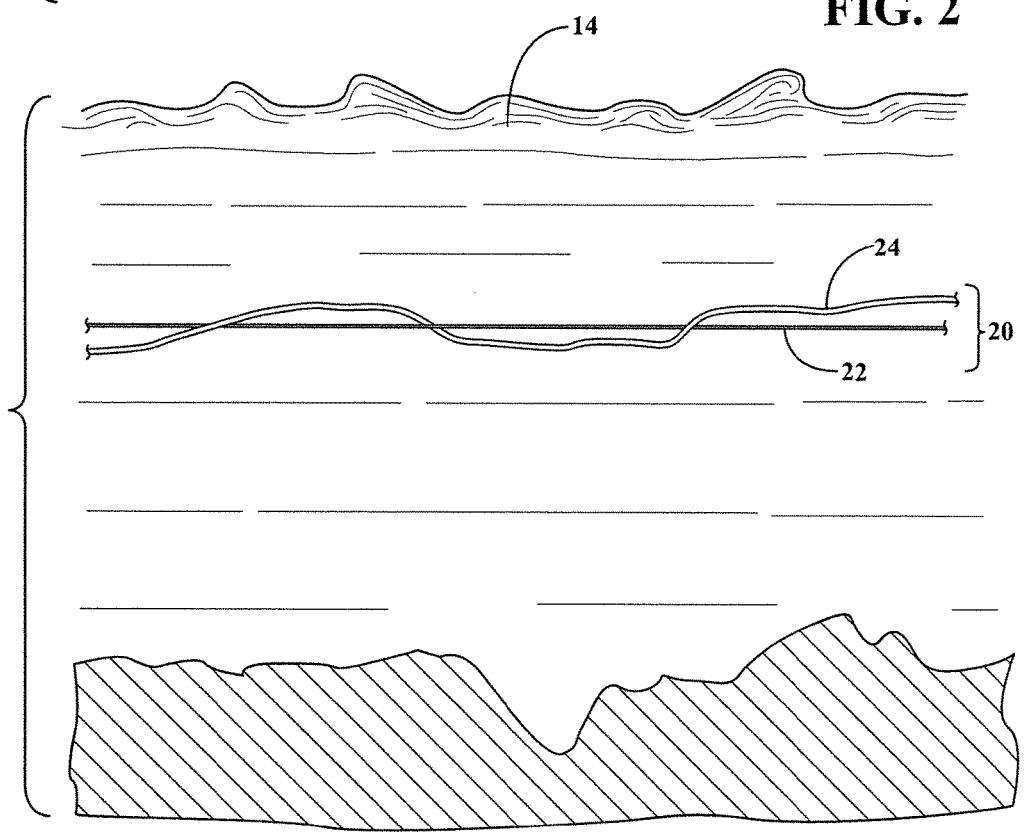
FIG. 2 is a view of an embodiment of an optical fiber cable assembly in accordance with an embodiment of the present invention.

FIG. 2 illustrates a first embodiment of the present invention wherein a composite cable assembly 20 is formed by interconnecting an elongated element 22 with an elongated supplemental filament 24. In the illustrated embodiment, the filament 24 is loosely coiled around the elongated element 22. In one example, the element 22 is an optical fiber having a negative buoyancy in the fluid environment 14. The supplemental filament 24 may be any elongated element with a positive buoyancy such that the combination of the optical fiber 22 and filament 24 create a composite assembly with a composite buoyancy that is generally neutral in the fluid environment 14.

Figure 3:
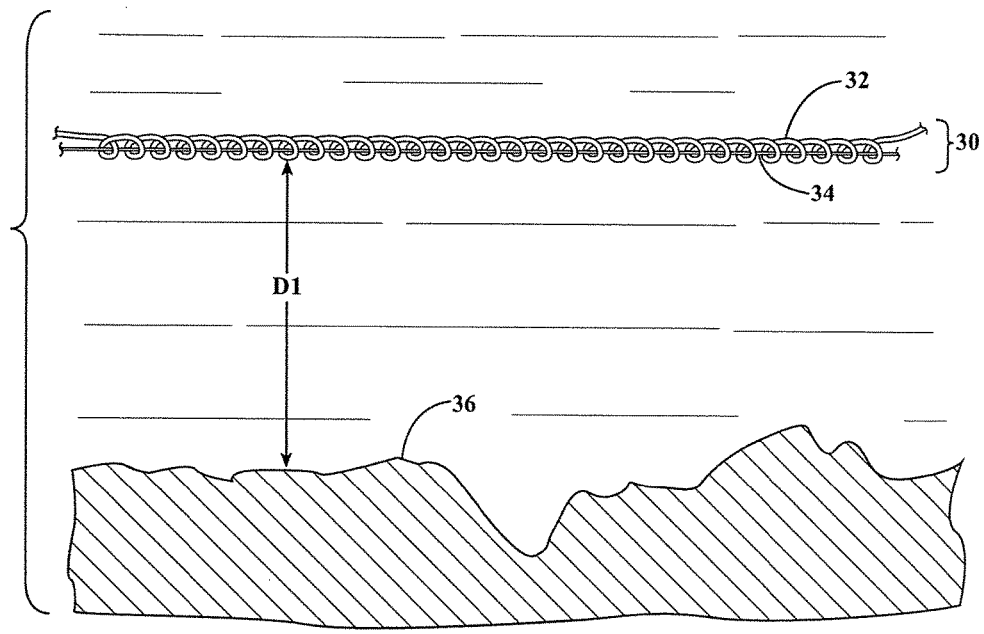
FIG. 3 is a view of another composite cable assembly in accordance with an embodiment of the present invention.

FIG. 3 illustrates a second embodiment of the present invention in which a composite assembly 30 includes an elongated element 32 and a supplemental filament 34. As shown, the supplemental filament 34 is coiled around the elongated element 32 with significantly more coils per unit length than in FIG. 2. As will be clear to those with skill in the art, the number of coils of filament per unit length of elongated element will depend on the relevant buoyancies of the element and filament as well as other factors. The assembly 30 is shown suspended in the fluid environment at a distance D1 above a lower boundary 36 of the fluid environment. While FIGS. 2 and 3 illustrate the elongated element and supplemental filament being interconnected by coiling the supplemental filament around the elongated element, numerous other approaches to connection may be used. For example, the elongated element may be partially coiled around the filament, the filament and elongated element may be glued together or the element and filament may be attached using connectors of any type, such as clips.

Figure 4:
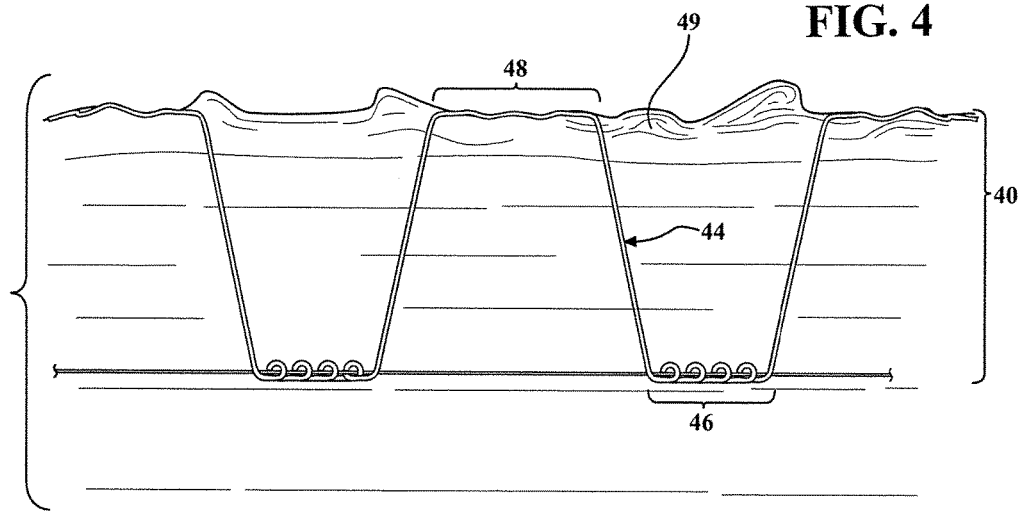
FIG. 4 is a view of another composite cable assembly in accordance with an embodiment of the present invention.

Referring now to FIG. 4, a third embodiment of the present invention is shown. Again, the composite assembly 40 includes an elongated element 42 and a supplemental filament 44. However, this embodiment differs in that the supplemental filament 44 includes connected portions 46 that are connected to the elongated element 42 and detached portions 48 that are not connected to the elongated element 42 such that the detached portions 48 may extend away from the elongated element 42 when in the fluid environment. In the illustrated embodiment, the filament 44 is continuous such that the connected portions 46 and detached portions 48 are part of the same elongated element. In the illustrated embodiment, part of the detached portion 48 extends to upper boundary 49 of the fluid environment and floats thereon. This may be referred to as a floating portion, and is a part of the detached portion. A transition portion extends between the floating portion and the connected portion 46 by extending downwardly in the fluid environment to the elongated element 42. Together, the floating portion and the transition portion make up the detached portion 48. The composite assembly 40 may be referred to as an assembly with self-compensating buoyancy. As will be clear to those with skill in the art, if the combined buoyancy of the elongated element 42 and the submerged portions of the filament 44 are positive, the elongated element 42 will rise towards the surface. This will allow an additional length of filament 44 to become part of the floating portion, thereby reducing the amount of filament 44 that is submerged and reducing the composite buoyancy of the submerged portions of the composite assembly 40. If the combined buoyancy of the elongated element 42 and the submerged portions of the filament 44 is negative, the elongated element 42 will sink, causing additional filament 44 to be submerged. Put another way, the total amount of filament making up the floating portion and the transition portion will stay the same, but some of the floating portion will become transition portion or vice versa. This will continue until such time as the composite buoyancy of the elongated element and the submerged portions of the filament reach neutral or positive buoyancy with respect to the surrounding fluid environment, at which point the elongated element 42 will stabilize or rise. As will be clear who are skilled in the art, by selecting the relative buoyancy of the elongated element 42 and filament 44, and the amount of filament 44 that is detached, the approximate distance below the surface may be chosen.

FIG. 5 shows a fourth embodiment of the present invention. This embodiment differs from the third embodiment in that the supplemental filament takes the form of filament segments 54 and 56 that are spaced apart along the length of the elongated element 52. Each filament segment has a connected portion 55 that is connected to the elongated element 52, such as by being coiled around the element 52, and a disconnected portion 57 that may extend away from the elongated element 52 when in the fluid environment. The connected portion 55 and disconnected portion 57 are continuous with each other. As with the third embodiment, part of the disconnected portion extends to the upper surface of the fluid environment and floats thereon. Again, the distance at which the elongated element 52 is dispensed below the surface may be selected by choosing the buoyancies of the component parts, the spacing between the segments 54 and 56, the quantity of filament per unit length of elongated element 52, and the amount of filament that is disconnected. It should also be noted that the amount of filament that may be disconnected may change over time, if the filament partially uncoils.

According to a further aspect of the present invention, the composite assembly may include more than one supplemental filament. For example, a first supplemental filament may have a positive buoyancy while a second supplemental filament has negative buoyancy. Alternatively, both supplemental filaments may have a positive buoyancy or both may have a negative buoyancy. As one example, an optical fiber, having a negative buoyancy in a fluid environment, may have a first supplemental filament connected thereto with the first supplemental filament having a positive buoyancy. The quantity of filament per unit length of optical fiber may be chosen such so that the combination has a buoyancy close to neutral buoyancy in the fluid environment. A second supplemental filament may be connected to the elongated element so as to fine tune the overall buoyancy. For example, if the combination of the elongated element and first supplemental filament is slightly negative, the second filament may add enough buoyancy so as to provide an overall neutral buoyancy. Alternatively, if the elongated element and first supplemental filament have a combined slightly positive buoyancy, the second filament may have a negative buoyancy such that the overall assembly has a neutral buoyancy.

FIG. 6 illustrates a fifth embodiment of the present invention. A composite assembly 60 includes an elongated element 62, such as an optical fiber, a first supplemental filament 63 that is connected to the elongated element 62 by being coiled thereabout, and a second supplemental filament 64 that has connected portions 65 connected to the elongated element 62 and detached portions 66 that are not connected and can therefore extend away from the elongated element 62 in the fluid environment. In the illustrated embodiment, the second supplemental filament 64 has a negative buoyancy such that the detached portion 66 extend downwardly to a lower boundary 67 on the fluid environment. The composite assembly 60 functions similarly to the embodiment of FIGS. 4 and 5, in that the elongated element 62 will rise or fall until the effective buoyancy of the overall assembly stabilizes. The part of the second supplemental filament that is dispensed on the lower boundary 67 of the fluid environment may be referred to as a supported portion and the part that extends from the lower boundary to the elongated element as a transition portion.

FIG. 7 shows a sixth embodiment of the present invention. A composite assembly 70 includes an elongated element 72, a first supplemental filament 73, and a second supplemental filament 74. This embodiment differs from the embodiment in FIG. 6 in that the combination of the elongated element 72 and first supplemental filament 73 is negative while the supplemental filament 74 has a positive buoyancy and has disconnected portions that extend upwardly to the upper boundary of the fluid environment.

FIG. 8 illustrates the seventh embodiment of a composite assembly 80 including an elongated element 82, a first supplemental filament 83, and a second supplemental filament that takes the form of filament segments 84 and 85.

FIG. 9 illustrates an exemplary operation of the embodiment of FIG. 8 in which the filament in segment 85 has become detached from the remainder of the assembly 80. As shown, part of the composite assembly will then sink downwardly. However, adjacent segments, as such as 84, will compensate allowing the overall composite assembly 80 to continue to function. In a further version of the invention, a supplemental filament may be provided with disconnected portions extending upwardly (positively buoyant) and another supplemental filament may be provided with disconnected portions extending downwardly (negatively buoyant).

A composite assembly in accordance with the present invention may take a variety of forms. In some embodiments, the elongated element is a communication or signal carrying element such as an optical fiber cable. However, the present invention also contemplates other types of elongated elements wherein functionally neutral buoyancy is desirable. Examples include other types of elongated communication carrying elements such as wires and cables.

In embodiments of the present invention wherein the elongated element is an optical fiber cable, this optical fiber cable may be either a "raw" fiber or a jacketed cable having at least one optical fiber surrounded by the jacket. The use of raw fiber is advantageous for some embodiments in that this fiber is less expensive and bulky than jacketed or other types of cables. As known to those with skill in the art, optical fiber typically consists of a core and a cladding with the interface between the core and cladding providing a reflective barrier for containing the optical signal. In some types of optical fiber, the core and cladding are both formed of glass. A coating or jacket may be provided over the cladding to provide some protection. As used herein, a "raw" optical fiber may mean an optical core, an optical core with cladding, or an optical core, cladding and jacket wherein the jacket is applied directly to the cladding.

FIG. 10 illustrates a cross-sectional view of an exemplary raw optical fiber 90. The optical fiber 90 includes a core 92 surrounded by a cladding 94 which is covered with a coating or jacket 96. The relative dimensions of the components in FIG. 10 may not be representative of some optical fibers. Some raw optical fibers use an acrylate polymer or polyimide coating. One type of raw optical fiber that may be used with the present invention is Corning FMF-28. This is a glass optical fiber having a core, a cladding and a coating. The core 92 may have a diameter D2 of 8.2 microns, the cladding 94 may have a diameter D3 of 125 microns and the coating 96 may have a diameter D4 of 242 microns. Such a raw optical fiber may have a density approximately twice that of water, making it negatively buoyant.

In the description above, a "jacketed cable" was discussed, as one example of an elongated element for use with the present invention. As used herein, such a jacketed cable means a cable with at least one raw optical fiber, such as in FIG. 10, contained within a larger jacket. A jacketed cable may also be other types of cable having an outer jacket, such as communication cable. This larger jacket should not be confused with the coating 96 provided directly on the cladding of the raw optical fiber. This larger jacket forming the outer surface of the jacketed cable will typically include more than one raw optical fiber as well as additional elements such as for strengthening of the overall assembly. Such a jacketed cable may have a positive, neutral, or negative buoyancy, with the buoyancy being adjusted in accordance with the embodiments of the present invention. It is also noted that the embodiments of the present invention discussed herein do not have a jacket enclosing the supplemental filaments with the elongated element. Instead, the supplemental filaments are outside the elongated element and exposed to the surrounding fluid environment.

A supplemental filament used with the present invention may have a positive or negative buoyancy, depending on the buoyancy of the elongated element being supported in a fluid environment and whether the supplemental filament is a first or second supplemental filament. In one example, the supplemental filament is a positively buoyant thread. One example is a polypropylene thread formed of a plurality of tightly wound finer fibers. Such a thread is shown at 100 in FIG. 11. Examples include threads with a thread weight of 46, 69 or 96, though others may be used. In some versions, the density (specific gravity) of the polypropylene itself is approximately 0.9. However, a polypropylene thread formed of finer fibers traps air very tightly such that the composite density (specific gravity) of the polypropylene thread may approach 0.5 for mass produced thread. The material itself may have other densities and other composite densities, with the present invention not being limited to any specific densities. In some embodiments, the diameter D5 of the thread 100 is greater than the diameter D4 of the raw optical fiber. As one example, the diameter D5 is approximately three times the diameter D4. Other diameters may also be used, partially depending on the quantity of supplemental filament used per unit length of the raw optical fiber. Alternatively, a solid thread may be used. As a further alternative, a hollow thread may be used, such as shown at 102 in FIG. 12. A low density polyethylene (LDPE) thread may be used as a positive buoyancy element. Fishing line, such as formed of high density polyethylene (HDPE) may be used as a negative buoyancy element. It should be noted that the filament or filament segments used in embodiments of the present invention is preferably of consistent diameter and material along its length. The present invention is not limited to any specific filament diameter. FIG. 13 illustrates a cross-sectional view of a raw optical fiber 90 connected to a thread 100.

As discussed above, the present invention allows an elongated element to be suspended between an upper and lower boundary of a fluid environment. It should be understood that an elongated element, as this term is used herein, means an element that is very long, such as extending for multiple miles between a ship and a communication site. Such an elongated element may have a width, thickness or diameter that is very small relative to its overall length. Preferably the elongated element has a consistent diameter and construction along its length. An elongated filament for use with the present invention also has a width, thickness or diameter that is very small relative to its overall length. While the elongated element and filament are both illustrated as having a circular cross-section, other cross-sectional shapes may also be used.

Referring again to FIG. 1, the composite communication assembly 16 is shown dispensed in the fluid environment and extending between the ships 10 and 12. Obviously, the assembly 16 at some point must be dispensed into the fluid environment and extended from one ship to another point. This may be accomplished in a variety of ways. In one approach, the assembly is pre-assembled with the supplemental filament or filaments attached to the elongated element. This pre-assembled assembly may be stored such as on a spool and then dispensed into the fluid environment. In another approach, the elongated element and the supplemental filament or filaments are stored separately and assembled into the composite assembly as the component elements are dispensed. As another approach, an elongated element and a first supplemental filament are pre-assembled and a second supplemental filament is connected thereto as the assembly is dispensed. By assembling the composite assembly at the time of use, the amount of supplemental filament or filaments per unit length of the elongated element may be adjusted for the actual conditions. Supplemental filaments or filament segments may also be added after the composite assembly is in the fluid environment, to adjust performance. The illustrated embodiments show one or two supplemental filaments, but additional supplemental filaments may be used. Also, more than one type of filament segment may be used, such that some have different buoyancies than others.

The present invention further provides a disposable composite cable assembly adapted for use as an Above Bottom Fiber (ABF) in a fluid environment, such as an undersea communication transport. The disposable composite cable assembly includes an elongated element, such as a raw glass fiber which is negatively buoyant, covered with low-density materials with positive buoyancy. The low-density materials may be micro elements such as microspheres or non-micro materials such as Styrofoam balls.

Figure 15:
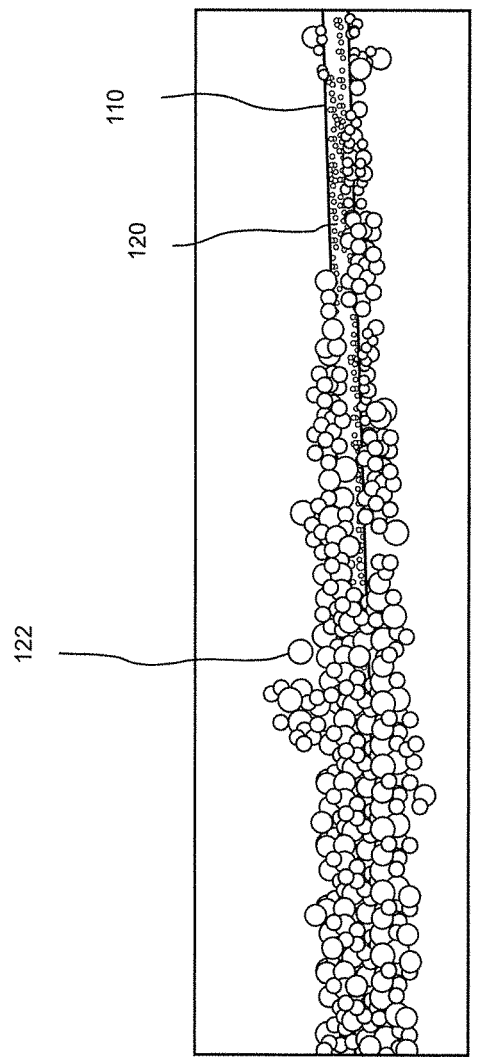
FIG. 15 is a zoomed-in view of a petroleum jelly & microsphere coated raw glass fiber in accordance with an embodiment of the present invention.

The low-density materials 122 may be mixed into a grease/gel-like substance 120, such as petroleum jelly, to cover the fiber 110. Alternatively, the fiber 110 may be lightly coated with weak adhesives 120 such as petroleum jelly and then covered with the low-density materials 122 such as flour-like microspheres, as shown in FIG. 15.

The low-density materials are positively buoyant. The floating low-density materials cause the coated fiber to float. The coating of the microspheres and the weak adhesives is inert to the fiber, and therefore does not change the surface chemistry of the fiber. Additionally, for certain embodiments, all of the components of the composite cable assembly are individually approved as environmentally-acceptable, including the low-density materials, the weak adhesives, and the fibers, thereby simplifying and lowering the cost of the process to change buoyancy.

The elongated element may be raw fibers or cables. Cables refer to coated or jacketed fibers. The present invention may be utilized with a fiber of any diameter, ranging from 10 microns to several centimeters. A single mode raw fiber is about 250 microns in diameter. The smallest fiber may be about 10-20 microns in diameter. A plastic fiber may be about 600 microns in diameter. The size of the microspheres is comparable to the fiber or cable which the microspheres are attached to. The microspheres range mostly from 10 to 100 microns, with a maximum at 250 microns, preferably 20-60 microns in diameter. The sizes of the microspheres are larger for larger fibers or cables.

In one embodiment, the fiber diameter is about 250 microns, while the microsphere diameter is about 150 microns. The microspheres may be 3M™ ceramic microspheres or Hy-Tech ThermaCels™ ceramic paint additives or microspheres which reside in toothpaste as a cleaning agent, as well as other microspheres.

Figure 14:
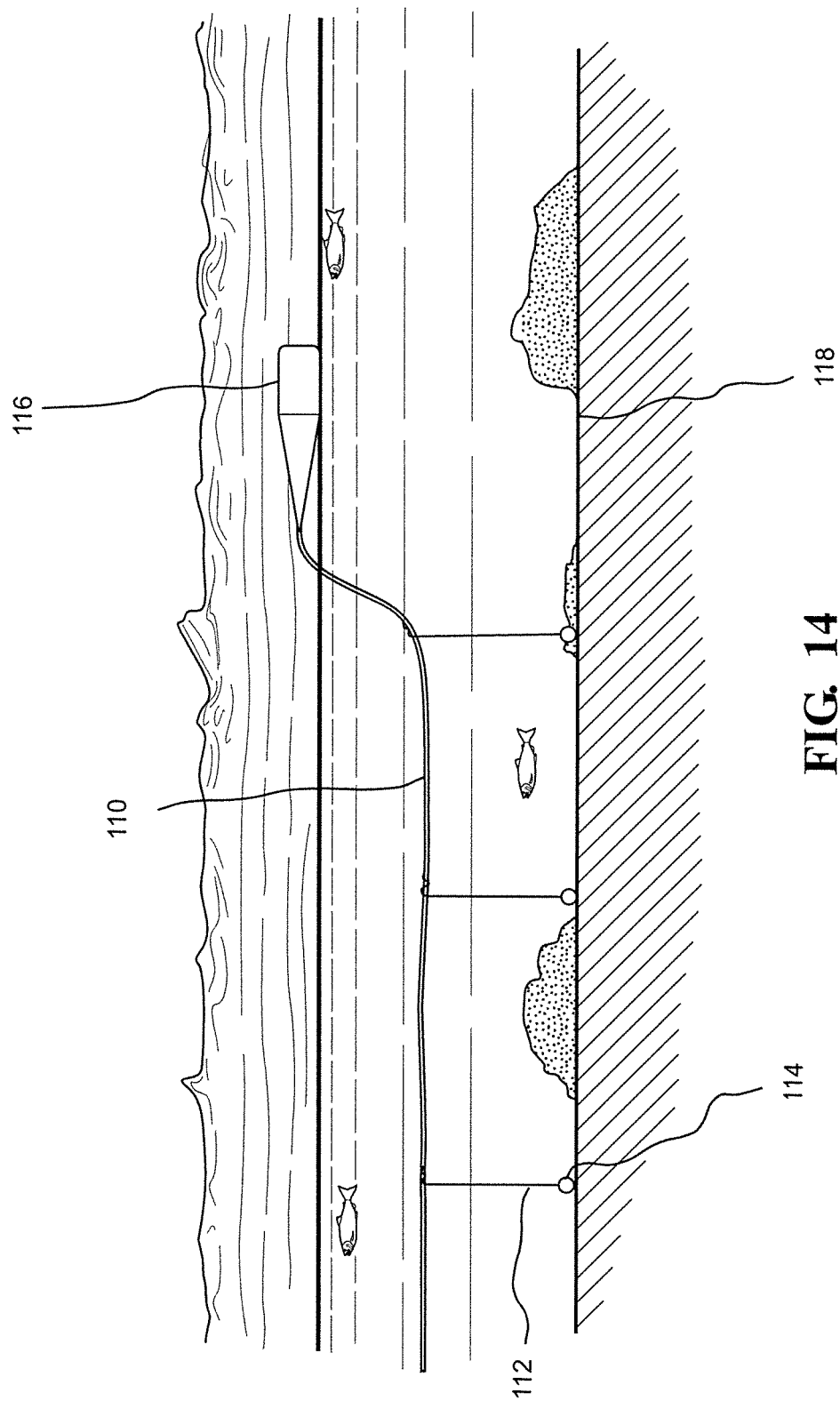
FIG. 14 is a view of a composite cable assembly in accordance with an embodiment of the present invention.

As shown in FIG. 14, anchor/dropper lines 112 may be periodically attached to the microsphere coated raw glass fiber 110. The raw glass fiber 110 is attached to a fiber spool and payout guide 116. The fiber spool and payout guide 116 is optional. The term "periodically" may mean at equal intervals or non-equal intervals. Anchor/dropper lines can be cotton threads. For example, fine cotton 1 lb test threads may be used. Anchor weights 112 are optional. The cotton threads may have tail ends coated with iron filings adhered with petroleum jelly. The tail ends may also be micro-wire/chain which rests at the bottom of the liquid environment 118.

The ABF design of the present invention results in all components except for the low-density materials such as the microspheres sinking to the bottom after use. As wave motion and biologics interact with the fiber, the microspheres will detach and float to the surface. When some percentage of the microspheres release, the entire system will become negatively buoyant and all elements will sink to the bottom. Raw fiber optic near the bottom as well as fine biodegradable cotton is broken apart by biologics and currents that move the fiber over coral and sharp rocks. Since the raw fiber is nearly 100% pure silicon, it essentially breaks down into sand. Slowly dissolving/corroding anchor weights hold the fiber in place during the period before they completely dissolve. Adhesive selection can be organic and can dissolve.

The suspension depth and the sink rate of the ABF before the components start to sink to the bottom and dissolve can be controlled by using different types of the adhesives or different size of the microspheres. The weight of the fiber, anchor lines and the optional anchor weights are factors too. For example, for a fiber with a diameter of less than 250 microns, there are less than 4 in$^3$ and less than 4 ounces of fiber per mile, less than 0.5 in$^3$ and less than 0.2 ounces of petroleum jelly is needed to attach less than 0.5 in$^3$ and less than 0.2 ounces of ceramic microspheres to the fiber which is necessary to keep the assembly float. Much less cotton thread than the fiber is needed. For example, for a mile of fiber, less than 0.5 in$^3$ and less than 0.3 ounces of cotton 1 lb test thread as well as optional corroding weights of less than 0.2 in$^3$ and less than 0.3 ounces may be used. Only the fiber is continuous. The ceramic microspheres as well as adhesives may be coated to the fiber surface continuously or periodically.

Other than being disposable, certain embodiments of the above bottom fiber of the present invention provides additional benefits such as its low cost, reliability, low SWaP, high gbps throughput and rapid replaceability.

As will be clear to those with skill in the art, the herein illustrated and described embodiments of the present invention may be altered in various ways without departing from the scope or teaching of the present invention. It is the following claims, including all equivalents, which define the scope of the present invention.

The invention claimed is:

1. An elongated cable assembly adapted for use in a water environment having an upper boundary and a lower boundary, comprising:
    an elongated cable having a naturally negative buoyance in a water environment, the elongated cable having an outer surface;
    micro particles having a positive buoyancy attached to the outer surface of the elongated cable;
    the quantity of the micro particles per unit length of the elongated cable being chosen such that the assembly is neutrally or positively buoyant at a suspension depth in the water environment; and
    wherein a micro particle is defined as a particle having a maximum dimension of about 250 microns.

2. An elongated cable assembly in accordance with claim 1, wherein the micro particles are microspheres.

3. An elongated cable assembly in accordance with claim 2, wherein the microspheres comprises a ceramic powder.

4. An elongated cable assembly in accordance with claim 1, wherein the micro particles are coated on the outer surface of the elongated cable by an adhesive, the micro particles being in direct contact with the adhesive.

5. An elongated cable assembly in accordance with claim 4, wherein the adhesive has a positive buoyancy.

6. An elongated cable assembly in accordance with claim 4, wherein the adhesive is organic.

7. An elongated cable assembly in accordance with claim 4, wherein the adhesive is petroleum jelly.

8. An elongated cable assembly in accordance with claim 4, wherein the suspension depth is controlled by controlling the size of the micro particles, type of the adhesive, and type of the elongated cable.

9. An elongated cable assembly in accordance with claim 1, further comprising anchor lines periodically attached along the elongated cable to keep the elongated cable anchored from drifting off in the water environment.

10. An elongated cable assembly in accordance with claim 9, further comprising one or more anchor weights attached to an end of at least some of the anchor lines.

11. An elongated cable assembly in accordance with claim 10, wherein the anchor weights are degradable.

12. An elongated cable assembly in accordance with claim 9, wherein the anchor lines are degradable.

13. An elongated cable assembly in accordance with claim 1, wherein the micro particles detach from the surface of the elongated cable after a period of time resulting in the cable assembly sinking to the lower boundary of the water environment at a sink rate.

14. An elongated cable assembly in accordance with claim 13, wherein the sink rate is controlled by controlling the size of the micro particles and type of the attachment.

15. An elongated cable assembly in accordance with claim 1, wherein the elongated cable is a raw optical fiber.

16. An elongated cable assembly in accordance with claim 1, further comprising an adhesive attached to and in contact with the outer surface of the elongated cable, wherein the micro particles are attached to the outer surface of the elongated cable by being in direct contact with the adhesive.

17. An elongated cable assembly in accordance with claim 16, wherein the micro particles are microspheres.

18. An elongated cable assembly in accordance with claim 16, wherein the adhesive is petroleum jelly.

19. A method of suspending an elongated cable assembly in a water environment, comprising the steps of:
providing an elongated cable having a negative buoyancy;
attaching a quantity of positively buoyant micro particles per unit length to the elongated cable such that the elongated cable assembly has a neutral or positive composite buoyancy;
wherein a micro particle is defined as a particle having a maximum dimension of about 250 microns.

20. A method of claim 19, wherein the attaching step comprises attaching with an adhesive having a positive buoyancy.

21. A method of claim 20, further comprising the step of the micro particles detaching from the surface of the elongated cable resulting in the cable assembly sinking to the lower boundary of the water environment at a sink rate.

22. A method of claim 21, wherein the sink rate is controlled by controlling the size of the micro particles, type of the adhesive, and type of the elongated cable.

23. A method of claim 20, wherein the elongated cable and the adhesive are degradable.

24. A method of claim 19, further comprising the steps of providing anchor lines and attaching the anchor lines to the elongated cable.

25. A method of claim 24, wherein the anchor lines have a negative buoyancy such that the elongated cable assembly has a controllably composite buoyancy.

* * * * *